United States Patent
Chandrasekaran

(10) Patent No.: US 9,021,440 B1
(45) Date of Patent: Apr. 28, 2015

(54) SYSTEM AND METHOD FOR AUTOMATED TEST SCRIPT GENERATION

(71) Applicant: PMC-Sierra US, Inc., Sunnyvale, CA (US)

(72) Inventor: Arvind Chandrasekaran, Bangalore (IN)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 14/456,996

(22) Filed: Aug. 11, 2014

(51) Int. Cl.
*G06F 9/44* (2006.01)
*G06F 11/36* (2006.01)

(52) U.S. Cl.
CPC ........ *G06F 11/3684* (2013.01); *G06F 11/3664* (2013.01)

(58) Field of Classification Search
CPC .................................................. G06F 11/3684
USPC .......................................................... 717/124
See application file for complete search history.

(56) References Cited

U.S. PATENT DOCUMENTS

| | | | |
|---|---|---|---|
| 8,448,155 B2 | 5/2013 | Bordelon et al. | |
| 8,533,670 B2 | 9/2013 | Dye et al. | |
| 2008/0184206 A1* | 7/2008 | Vikutan | 717/127 |
| 2009/0287958 A1* | 11/2009 | Bhatt et al. | 714/26 |

OTHER PUBLICATIONS

National Instruments Corporation, "NI PXI and LabVIEW Deliver Unrivaled Performance, Flexibility, and Value for Automated Test," Publish Date: May 23, 2013, Internet publication at http://www.ni.com/white-paper/14300/en/, printed Aug. 11, 2014, 5 pages.

* cited by examiner

*Primary Examiner* — Anna Deng
(74) *Attorney, Agent, or Firm* — Dennis R. Haszko

(57) ABSTRACT

A system and method for automatically generating a test script includes receiving a test case flow that includes steps, nodes, and sub-nodes, wherein each sub-node is associated with a use-case based application programming interface (UC-API), for each sub-node of the test case flow retrieving a template array corresponding to the UC-API associated with the sub-node, generating a test array wherein for each node in a step, generating a node array wherein the elements of each node array includes the sub-node arrays associated with the sub-nodes of the node, for each step, generating a step array wherein the elements of each step array include references to the node arrays of the nodes in the step, and populating the test array wherein each element of the test array includes one of the step arrays.

18 Claims, 6 Drawing Sheets

220

| | A | B | C | D |
|---|---|---|---|---|
| 2 | | Test Script Name: | idt-demo | |
| 3 | | | | |
| 4 | | Test Description: | Test 1 | |
| 5 | | Test Coverage: | Test 1 in Test Plan 1 | |
| 6 | | Author: | Arvind Chandrasekaran | |
| 7 | | | | |
| 8 | | Step1 | | |
| 9 | | | | |
| 10 | | Process1 | | |
| 11 | | | | |
| 12 | | 1. Create 3 LD(s) of stripe size NA, size 100 GB, raid level 5, legs NA, init priority NA, method NA, read cache NA, write cache NA using 4 ready drives of type SSD, size NA, blocksize NA | | |
| 13 | | | | |
| 14 | | Step2 | | |
| 15 | | | | |
| 16 | | Process1 | Process2 | |
| 17 | | | | |
| 18 | | 1. Track the task Build/Verify to 70 % completion on the LD(s) AUTOLD1. | 1. Create 3 partition(s) of size 10 GB on the LD(s) AUTOLD 2 | |
| 19 | | 2. Delete the LD(s) AUTOLD 1. | | |

902 — (rows 2–6)
904 — (Step1 block)
906 — (Step2 block)

FIG. 6

SYSTEM AND METHOD FOR AUTOMATED TEST SCRIPT GENERATION

TECHNICAL FIELD

The present disclosure relates to systems and methods for automated test script generation for use in an automated product testing.

BACKGROUND

Development of software and hardware products includes a development stage and a testing life cycle. The testing life cycle includes writing a test plan, designing test cases to implement the test plan, and executing the test cases on a target product to ensure the target product is of suitable quality. A target product may be hardware, software, or a combination of hardware and software. Because test case execution is a complex, time consuming, and resource intensive process, test automation utilizing test automation frameworks (TAF) may be utilized to reduce the resources utilized in executing test cases. TAFs refer to the use of software and hardware to execute a test case on a target product.

Test automation includes a TAF that executes a test scripts. A test script is a programmed code that automates the test case by calling subroutines or application programming interfaces (APIs) exported by the TAF. The TAF provides the backend support for executing test script, including the infrastructure for creating processes and tracking and controlling remote test setups.

A test case may include complex logic in which multiple processes, tools, and systems are utilized. The test case may include parallel and sequential processes, with each process performing one or more testing functions. Generating a test script that, when executed by the TAF, will perform the test case includes developing, reviewing, and debugging the test script code, which may be time intensive.

Test script code for test case automation is desirably generated by a script developer who has expertise in the target product under test, including the user interface of the target product, as well as expertise in test automation in a TAF environment, including developing test plans and test cases utilized for the testing and programming test scripts in the scripting language utilized for testing, such as, for example, Perl, Python, shell, C, C++, or Java. In practice, finding a single person with the desired level of expertise in the target product and test automation in a TAF environment may be difficult. For example, a product engineer may have sufficient expertise in the target product, but may lack sufficient expertise in test case automation. Alternatively, a software engineer may have sufficient expertise in test case automation, but may lack sufficient expertise in the target product to adequately design test plans and test cases.

Improvements to test cases automation are desired.

SUMMARY

One aspect provides a computer-implemented method of automatically generating a test script for testing a target system comprising receiving a test case flow that includes one or more steps, each step including one or more nodes, each node including one or more sub-nodes, wherein the steps are to be executed sequentially, the nodes of each step are to be executed in parallel, and the sub-nodes of each node are to be executed sequentially, wherein each sub-node is associated with a use-case based application programming interface (UC-API), and wherein each step, node, and sub-node includes a unique identifier, for each sub-node of the test case flow retrieving a template array corresponding to the UC-API associated with the sub-node, and replacing a first placeholder in the template with the unique identifier of the sub-node to create a unique sub-node array, generating a test array utilizing the test case flow, wherein generating comprises, for each node in a step, generating a node array wherein the elements of each node array includes the sub-node arrays associated with the sub-nodes of the node, and wherein the sub-node arrays are sorted according to an order of the sub-nodes in the node of the test case flow, for each step, generating a step array wherein the elements of each step array include references to the node arrays of the nodes in the step, and populating the test array wherein each element of the test array includes one of the step arrays.

The computer-implemented method may further comprise testing the target system utilizing the test array, wherein testing comprises parsing the test array for step arrays, for each step array parsing the step array for node array references, forking a node process for each node array reference of the step array, for each node process, in parallel dereferencing the node array for the sub-node arrays associated with the sub-nodes, for each sub-node array executing the UC-API associated with the sub-node such that the sub-nodes of the node process are executed sequentially according to the order of the sub-nodes in the graphical representation of the node, and wherein the step arrays are parsed sequentially according to the order of the associated steps.

The UC-APIs associated with the sub-node arrays may not rely on other UC-APIs such that there is no data flow between UC-APIs.

The computer-implemented method may further comprise automatically generating a document including a text description of the test case flow, wherein the document includes a description of the UC-API associated with each sub-node of the test case flow, and wherein the document includes a table associated with each step, wherein each table includes a column associated with each node of the step, and each column includes a row associated with each sub-node of the node.

The test case flow may be generated using a graphical user interface (GUI) such the graphical representations of the steps of the test case flow are arranged vertically to indicate that steps are performed sequentially, and the graphical representations of the nodes associated with a step are arranged horizontally within the graphical representation of the step to indicate that the nodes are performed in parallel.

Selecting a graphical representation of a node may cause a node define window to be displayed, wherein the node define window displays graphical representations of the sub-nodes associated with the node.

A graphical representation of a sub-node may include a drop down list for selecting an UC-API associated with the sub-node from a plurality of UC-APIs.

The test case flow may be received from metadata stored in a memory, wherein the metadata includes the name of the test case flow, the number of steps in the test case flow, the number of nodes in each step, the number of sub-nodes in each node, the name of the UC-API associated with each sub-node, and selected arguments for each UC-API associated with each sub-node.

A graphical representation of each sub-node may include selected arguments for the associated UC-API, wherein the computer-implemented method further comprises replacing an argument placeholder of the template of a sub-node array with a selected argument from the graphical representation of the sub-node associated with the sub-node array.

Another aspect provides A system for testing a target product, the system comprising a test script generator comprising a test script memory storing a plurality of templates, each template corresponding to one of a plurality of use-case-based application programming interfaces (UC-APIs), a test script input for receiving a test case flow that includes one or more steps, each step including one or more nodes, each node including one or more sub-nodes, wherein the steps are to be executed sequentially, the nodes of each step are to be executed in parallel, and the sub-nodes of each node are to be executed sequentially, wherein each sub-node is associated with a UC-API stored in the memory, and wherein each step, node, and sub-node includes a unique identifier, and a test script processor in communication with the memory and the input, the test script processor configured to, for each sub-node of the test case flow, retrieve a template corresponding to the UC-API associated with the sub-node, and replace a first placeholder in the template with the unique identifier of the sub-node to create a sub-node template, generate a test array utilizing the test case flow, wherein generating comprises for each node in a step, generate a node array wherein the elements of each node array include the sub-node arrays associated with the sub-nodes of the node, and wherein the sub-node arrays are sorted according to an order of the sub-nodes in the node of the graphical representation, for each step, generate a step array wherein the elements of each step array include references to the node arrays of the nodes in the step, and populate the test array such that each element of the test array includes one of the step arrays.

The system may further comprise a test automation framework comprising a framework processor in communication with the test script generator, the processor configured to parse the test array for step arrays, for each step array parse the step array for node array references, fork a node process for each node array reference of the step array, for each node process, in parallel, dereference the node array for sub-node arrays associated with the sub-nodes of the node, for each sub-node array execute the UC-API associated with the sub-node array such that the sub-nodes of the node process are executed sequentially according to the order of the sub-nodes in the test case flow of the node, and wherein the step arrays are parsed sequentially according to the order of the associated steps.

The UC-APIs associated with the sub-node arrays may not rely on other UC-APIs such that there is no data flow between UC-APIs.

The test script processor may be configured to automatically generate a document including a text description of the test case flow, wherein the document includes a description of each UC-API associated with each sub-node of the test case flow, and wherein the document includes a table associated with each step, wherein each table includes a column associated with each node of the step, and each column includes a row associated with each sub-node of the node.

The test case flow may be generated using a graphical user interface (GUI) such the graphical representations of the steps of the test case flow are arranged vertically to indicate that steps are performed sequentially, and the graphical representations of the nodes associated with a step are arranged horizontally within the graphical representation of the step to indicate that the nodes are performed in parallel.

Selecting a graphical representation of a node may cause a node define window to be displayed, wherein the node define window displays graphical representations of the sub-nodes associated with the node.

A graphical representation of a sub-node may include a drop down list for selecting an UC-API associated with the sub-node from a plurality of UC-APIs.

The test case flow may be received from metadata stored in the test script memory, wherein the metadata includes the name of the test case flow, the number of steps in the test case flow, the number of nodes in each step, the number of sub-nodes in each node, the name of the UC-API associated with each sub-node, and selected arguments for each UC-API associated with each sub-node.

A graphical representation of each sub-node may include selected arguments for the associated UC-API, and wherein the test script processor is configured to replace a parameter placeholder of the template of a sub-node array with a selected argument from the graphical representation of the sub-node associated with the sub-node array.

DRAWINGS

The following figures set forth embodiments in which like reference numerals denote like parts. Embodiments are illustrated by way of example and not by way of limitation in the accompanying figures.

FIG. 1 is a schematic representation of an automated testing system according to an embodiment;

FIG. 2*a* is a graphical representation of a test case flow created utilizing a GUI if a test script generator according to an embodiment;

FIG. 2*b* is a graphical representation of a node define window of the GUI according to the embodiment of FIG. 2*a*;

FIG. 2*c* is graphical representation of an arguments window of the GUI according to the embodiment of FIG. 2*a*;

FIG. 6 is a screen shot of a test description document according to an embodiment.

DETAILED DESCRIPTION

Figure 1:
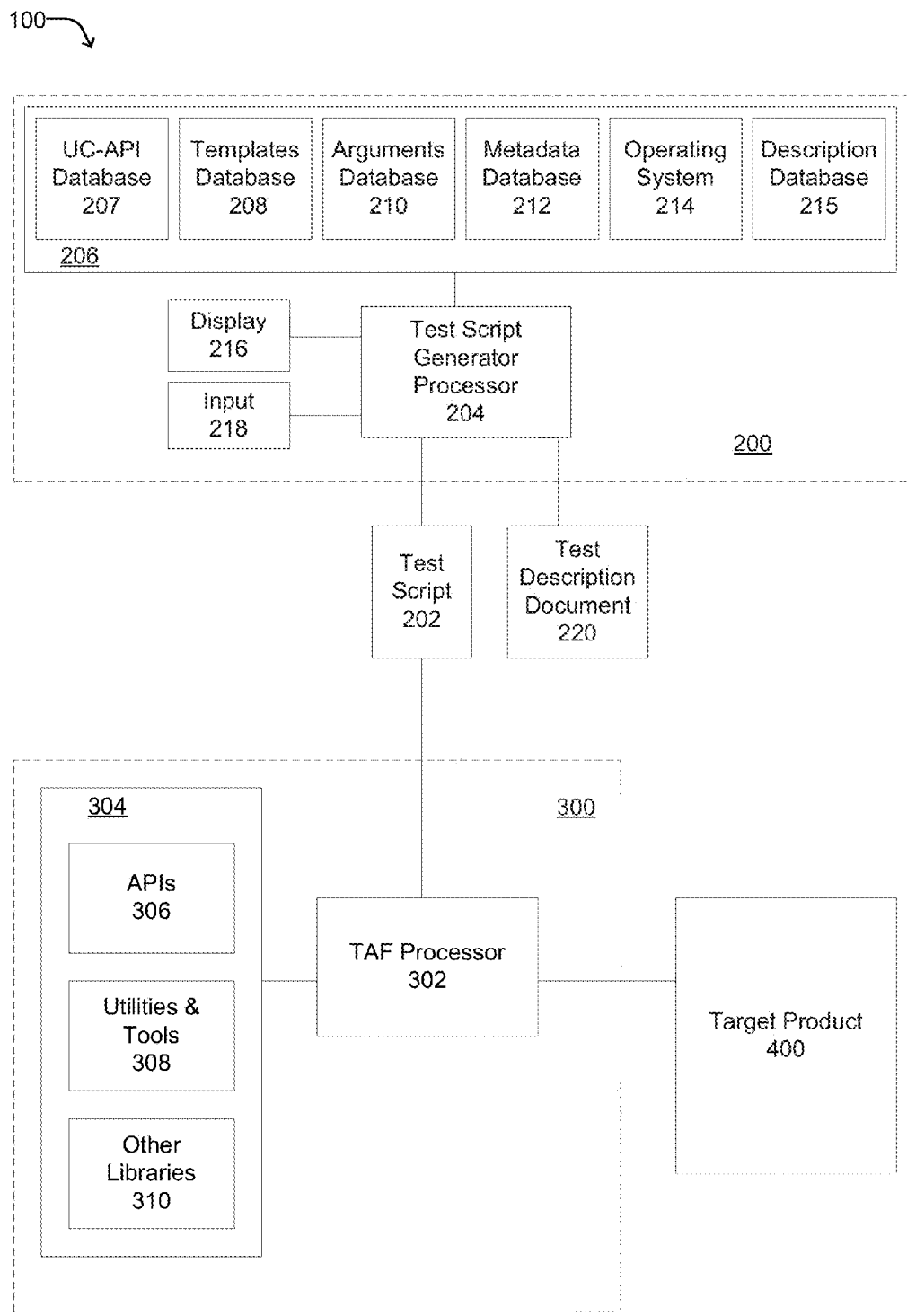

The following describes a system and method for automated test script generation. The system and method disclosed herein enable a user to perform test case automation without requiring the user to code the test scripts utilized by a test automation framework to perform the testing of a target product.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows a schematic diagram of a test automation system 100 including a test script generator 200, a test automation framework (TAF) 300, and a target product 400. The test script generator 200 generates a test script 202 that may be utilized by the TAF 300 to perform testing of the target product 400. The target product 400 may be hardware, software, or a combination of hardware and software. In addition to the test script 202, the test script generator 200 may automatically generate a test description document 220 based on the test case flow. The test document 220 typically includes a description of the test case.

The TAF 300 includes a TAF processor 302 and a TAF memory 304 that includes a library of application programming interfaces (APIs) 306, utilities and tools 308, and other libraries 310.

In test automation, the APIs 306 provide one or more functional commands utilized in testing a target product 400. The tools and utilities 308 and the other libraries 310 of the TAF 300 are databases stored in the TAF memory 304 and include tools, utilities, and other libraries that may be utilized in communicating with the target product 400 and executing a test script 202.

Tools that may be stored in the tools and utilities 308 database may include, for example, a utility utilized by the TAF 300 to configure, modify and test various RAID volumes and features of a RAID Adapter card, an input/output tool used to run various workloads on RAID Volumes and test data integrity of RAID volumes, and a volume performance testing tool utilized to test performance characteristics of volumes such as, for example, input/output operations per second and central processing unity (CPU) utilization at various work loads.

The test script generator 200 includes a test script generator processor 204, and a test script generator memory 206 that includes a use-case based application programming interfaces (UC-APIs) database 207, a templates database 208, an arguments database 210, a metadata database 212, an operating system 214 of the test script generator 200, and a descriptions database 215. The test script generator 200 may also include a display 216 and an input 218 that, together with the operating system 214, provide a graphical user interface (GUI) on which a user may create a test case flow. As discussed in more detail below, a test case flow is a graphical representation of the testing to be performed on the target product 400 and is utilized by the test script generator 200 as the basis for automatically generating the test script 202. The input 218 may be, for example, a mouse, a keyboard, a touch-sensitive overlay that overlies the display 216 to provide a touchscreen display, or other suitable input device.

The UC-API database 207 includes a list of UC-APIs that are included in the test script generator 200. UC-APIs map to one or more of the APIs 306 of the TAF 300 and are self-sufficient functions that do not rely on the output of other UC-APIs.

The templates database 208 includes a template array for each UC-API in the UC-API database 207 that is utilized by the test script generator processor 204 to generate the test script 202 utilized by the TAF 300 to perform the function associated with the UC-API. Each template array includes the name of the API 306 of the TAF 300 that the associated UC-API maps to, as well as an array reference including the hard-coded arguments for the API 306, and placeholders for the user-defined arguments. UC-APIs may be mapped to more than one API 306 of the TAF 300, in which case, the first element of the associated template array includes name of the first API 306 mapped to, the second element includes an array reference to the arguments of the first API 306, the third element of the includes the name of the second API 306 that the associated UC-API maps to, the fourth element include array reference to the arguments of the second first API 306 that the associated UC-API maps to, and so forth for additional APIs 306 that the associated UC-API maps to. Utilizing UC-APIs enables a user to create and implement a test case without knowledge of programming APIs 306.

In an example illustrating the template arrays in the template database 208, a UC-API named "CreateRaid5VolumeUsingReadyStateDrives" maps to a single API 306 of the TAF 300, "CreateRaidVolume". In this example, "CreateRaid5VolumeUsingReadyStateDrives" is associated the following template array stored in the template database 207:

my @CreateRaid5UsingReadyStateDrives_###-1###= ('CreateRaidVolume',
  ["###0###",
  "ReadyState",
  "Raid5",
  "###1###"]).

In this example, the name of the array is CreateRaid5UsingReadyStateDrives_###-1 ###, wherein the placeholder "###-1 ###" is provided such that, when the template array is utilized to create a test script 202, the "###-1 ###" placeholder is replaced with a unique identifier to create a unique array name even if a particular array is utilized more than once within the test script 202. The first element of the array is 'CreateRaidVolume', which is the name of the API 306 of TAF 300 that is called by the "CreateRaid5VolumeUsingReadyStateDrives" UC-API. The second element is an arguments array that includes the arguments accepted by the "CreateRaidVolume" API. In the example shown, the zeroth argument, which corresponds to "NumberOfDrivesToUse", and third argument, which corresponds to a "Size of Raid Volume" argument, are user-definable and are represented by placeholders ###0### and ###1 ### respectively. The first and second elements are hard-coded values based on the function performed by the UC-API. In the present example, the first argument, which corresponds to "State of Drives to Use", is hard-coded to "ReadyState" and the second argument, which corresponds to "Raid Level of Volume to Create", is hard-coded to 'Raid5'.

In an example that illustrates the difference between UC-APIs of the test script generator 200 and APIs 306 of the TAF 300, a test comprises four functions: Function 1 is creating a Raid 5 Volume using 5 drives in Ready state; Function 2 is creating a Raid 10 Volume using 2 drives in Ready state; Function 3 is delete the Volume created in Step 2; and Function 4 is running 10 using 10 Meter tool to the volume created in Function 1.

In order to perform the test utilizing convention APIs alone, a person familiar with test automation coding would have to manually write the code, including calls to intermediary APIs 306. An example of the coding that may be generated to perform the example test is:

```
#Function1
my $SelectedDrives1=SelectDrives (NumDrives=>5,
    State=>"Ready");
my $status=CreateRaidVolume (Raid=>5,
    Drives=>$SelectedDrives1, Name=>"Volume1");
my $status=CheckVolumeExists (Name=>"Volume1");
#Function2
my $SelectedDrives2=SelectDrives (NumDrives=>2,
    State=>"Ready");
my $status=CreateRaidVolume (Raid=>1,
    Drives=>$SelectedDrives2, Name=>"Volume2");
my $status=CheckVolumeExists (Name=>"Volume2");
#Function3
my $SelectVolume=SelectRaid(Name=>"Volume2");
my $status=DeleteVolume($SelectedVolume);
#Function4
my $ConfigFile=CreateIOConfigFile (AccessSpec=>"1,
    2,3", Read=>1, Write=>1, Volume=>"Volume1");
my $status=RunIOMeter(RunTime=>3600);
```

In the above code, "SelectDrives", "CheckVolumeExists", "SelectRaid", and "CreateIOConfigFile" are intermediary APIs 306 that are be utilized to generate values that are passed to the "CreateRaidVolume", "DeleteVolume", and "RunIOMeter" APIs 306 in order to perform the four functions of the example test. These intermediary APIs 306 are not intuitive to a person who is not familiar with test automation coding, making the generation of the above code difficult.

Performing the above example testing utilizing the UC-APIs of the test script generator 200 TAF can be performed utilizing, for example, only three UC-APIs without the need for intermediary UC-APIs. The UC-APIs found in the UC-API Database 207, together with the user-definable arguments, that may be utilized to perform the four functions of the above example test are:

CreateRaidVolume(NumDrives=>5, DriveState=>Ready, Raid=>5, Name=>"Volume1");
CreateRaidVolume(NumDrives=>2, DriveState=>Ready, Raid=>1, Name=>"Volume2");
DeleteRaid(Name=>"Volume2");
RunIOMeter(AccessSpec=>"1,2,3", Read=>1, Write=>1, Volume=>"Volume1", RunTime=>3600).

In the above example, the CreateRaidVolume UC-API in 306 is configured to receive the following arguments: NumDrives; DriveState; Raid; Name. The CreateRaidVolume UC-API includes a call to the SelectDrives API and passes the arguments NumDrives and DriveState. The value returned from the called SelectDrive API is a list of drive identifiers. The returned list of driver identifiers is utilized by CreateRaidVolume UC-API to create the Raid Volume.

An example of code to implement the CreateRaidVolume UC-API utilizing Perl is as follows:

```
Sub CreateRaidVolume {
    #Get Values from user
    my ($NumDrives, $DriveState, $Raid, $Name)=@_;
    #Call SelectDrives
    my     $DrivesSelected=SelectDrives($NumDrives, $DriveState);
    my $status=CreateVolume($DrivesSelected, $Raid, $Name);
    return $status;
}
```

In example code above, a user need not understand how to utilize the SelectDrives API of the TAF 300 because the CreateRaidVolume UC-API is configured to create the raid volume without the need for the user to include intermediately APIs.

An example of the test script that is generated, including sub-node arrays, for this example test case using Perl may be as follows:

```
#Start of script
    my @CreateRaid5VolumeUsingReadyDrives_s1n1sn1=
        ('CreateRaidVolume',
        ["5",
        "Ready",
        "Volume1"]);
    my @CreateRaid1VolumeUsingReadyDrives_s2n1sn1=
        ('CreateRaidVolume',
        ["2",
        "Ready",
        "1",
        "Volume2"]);
    my @DeleteRaidVolume_s3n1sn1=
        ('DeleteRaidVolume',
        ["Volume2"]);
    my @RunIOMeter_s3n2sn1=
        ('RunIOToRaidVolume',
        ["1,2,3",
        "Read=1",
        "Write=1",
        "Volume1",
        "3600"]);
    our @Test=( );
    push                @Test, [@CreateRaid5VolumeUsingReadyDrives_s1n1sn1];
    push                @Test, [@CreateRaid1VolumeUsingReadyDrives_s2n1sn1];
    push   @Test,   [[@DeleteRaidVolume_s3n1sn1], [@RunIOMeter_s3n2sn1]];
#End of script
```

Although the above examples are coded utilizing Perl, other programming languages may be utilized such as, for example, Python, shell, C, C++, and Java.

The arguments database 210 includes, for each UC-API stored in the UC-API database 207, the arguments associated with the UC-API that are user-definable. When a user is creating a test case flow, the arguments database 210 is utilized to determine which arguments the user is prompted to enter when a particular UC-API is included in the test case flow. Arguments that are user-definable for a UC-API correspond to the arguments in the associated template array that include placeholders.

The metadata database 212 stores metadata associated with a test case flow. Metadata for a test case flow that is stored in the metadata database 212 may include, for example, the name of the test, the number of steps, the number of nodes in each step, the number of sub-nodes in each node, the UC-API and the user-defined arguments associated with each sub-node. The test case flow metadata stored in the metadata database 212 may be utilized by the test script generator processor 204 to, for example, recreate a previously created test case flow to be used in recreating the test script 202 for that test case, or to serve as the basis for a user to create a new test case flow.

The description database 215 includes a template plain text description for each of the UC-APIs that includes a description of the functionality of the associated UC-API, the hard-coded arguments of the associated UC-API, and placeholders for the user-defined arguments of the associated UC-API. The description database 215 is utilized to create the test description document 220 that is discussed in more detail below.

As discussed above, the display 216, the input 218, and the operating system 214 may provide a GUI for the test script generator 200. The GUI enables a user to graphically create a test case flow comprised of steps, nodes, and sub-nodes. The test case flow is utilized by the test case generator processor 204 to generate the test script 202.

Each step of a test case flow comprises one or more nodes. Each node includes one or more sub-nodes. Steps within a test case flow are performed sequentially such that all nodes in a step are performed before the nodes of subsequent steps in the test case flow are performed. All nodes within a step of the test case flow are performed in parallel. Sub-nodes within a node of the test case flow are performed sequentially. Graphically organizing the test case flow into steps, nodes, and sub-nodes facilitates scheduling the various functions to be performed during the desired testing of the target product 400.

Each of the steps, nodes, and sub-nodes within a test case flow are uniquely identified. For example, each step may be identified as $S_x$, each node may be identified as $S_xN_y$, and each sub-node may be identified as $S_xN_ySN_z$, where x is an integers that represents the location of the step within the test case flow, y is an integer that represents the location of the node within a particular step, and z is an integer that represents the location of the sub-node within a particular node. In this example, $S_3N_2SN_5$ identifies the fifth sub-node in the second node of the third step in the test case flow. Each sub-node within the test case flow is associated with exactly one UC-API stored in the UC-API database 207 of the test case generator 200.

Figure 2A:
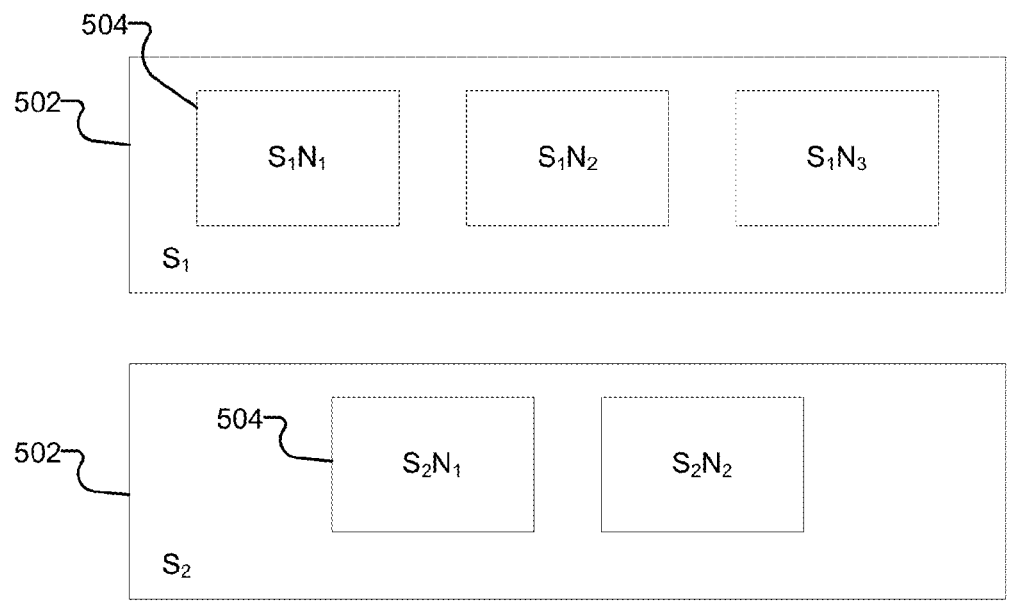
Figure 2B:
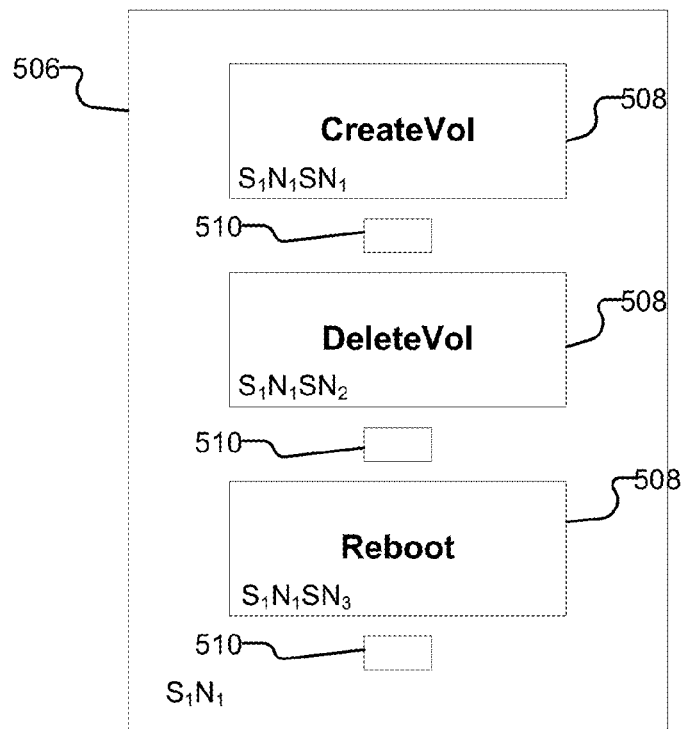
Figure 2C:
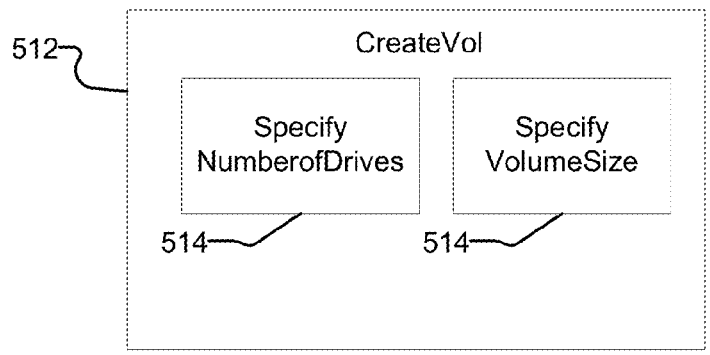

FIGS. 2a through 2c show an example of a graphical representation of a test case flow generated utilizing the GUI of the test script generator 200. FIG. 2a shows a graphical representation of a test case flow having two steps, $S_1$ and $S_2$. Step $S_1$ includes three nodes, $S_1N_1$, $S_1N_2$, and $S_1N_3$, and step $S_2$ includes two nodes, $S_2N_1$ and $S_2N_2$.

Steps $S_1$ and $S_2$ are graphically represented by outer step rectangles 502. In the test case flow shown in FIG. 2a, three nodes, $S_1N_1$, $S_1N_2$, and $S_1N_3$, are included in step $S_1$ and two nodes, $S_2N_1$ and $S_2N_2$, are included in step $S_2$. Nodes are graphically represented by inner node rectangles 504 within the outer step rectangles 502 of the associated step.

In the example shown, steps $S_1$ and $S_2$ are vertically arranged to indicate that steps $S_1$ and $S_2$ are executed sequentially, whereas the nodes $S_1N_2$, $S_1N_2$, and $S_1N_2$ within a step $S_1$ and nodes $S_1N_2$ and $S_1N_2$ within step $S_2$ are arranged horizontally to indicate that the nodes of a step are executed in parallel. Alternatively, steps may be arranged horizontally and nodes within each step arranged vertically to indicate sequential and parallel execution.

Sub-nodes within a node may be configured utilizing a node define window 506 associated with a node. FIG. 2b shows an example of a node define window 506 associated with node $S_1N_1$. The GUI may be configured such that the inner node rectangles 504 may be selectable to cause a node define window 506 to be displayed in which sub-nodes of the selected node may be created. The inner node rectangles 504 may be, for example, active hyperlinks such that a node define window 506 associated with a node is displayed when the inner node rectangle 504 for that node is selected via the input 218, for example, by performing a mouse click or by touching a touchscreen at a location associated with the inner node rectangle 504.

The node define window 506 in FIG. 2b includes three sub-nodes, $S_1N_1SN_1$, $S_1N_1SN_2$, and $S_1N_1SN_3$. Each sub-node $S_1N_1SN_1$, $S_1N_1SN_2$, and $S_1N_1SN_3$ is graphically represented by a combo box 508 that is utilized to select a UC-API from the UC-API database 207 that is associated with the sub-node. For example, the combo boxes 508 may comprise scrollable drop-down lists of the available UC-APIs stored the UC-API database 207. In the example shown in FIG. 2b, a "CreateVol" UC-API is associated with sub-node $S_1N_1SN_1$, a "DeleteVol" UC-API is associated with sub-node $S_1N_1SN_2$, and a "Reboot" UC-API is associated with sub-node $S_1N_1SN_3$.

A displayable arguments window 512 may be associated each sub-node to enable user-definable arguments for the UC-API associated with the sub-node to be input. FIG. 2c shows an example of an arguments window 512 associated with the "CreateVol" UC-API associated with the sub-node $S_1N_1SN_1$ shown in FIG. 2b. The node define window 506 may include a configure button 510 associated with each combo box 508 that, when selected, causes the associated arguments window 512 to be displayed. Displaying the arguments window 512 comprises determining the user-defined arguments for the associated UC-API utilizing the arguments database 210. A query field 514 is displayed in the arguments window 512 for each user-defined argument.

The arguments window 512 shown in FIG. 2c includes two query fields 514 for two user-defined arguments that are associated with the "CreateVol" UC-API. One or more of the query fields 514 may comprise, for example, a scrollable drop-down list that includes all possible values for the argument associated with the query field 514. One or more of the query fields 514 may comprise, for example, a text box in which a user may type in a value for the argument associated with the query field 514. The number and type of user-definable arguments and, thus, the query boxes 514 that are displayed in the arguments window 512, may vary for the different UC-APIs stored in the UC-API database 207.

Once the test case flow has been created, the metadata associated with the test case flow may be stored in the metadata database 212. Storage of metadata may be initiated by, for example, receipt at the test script generator processor 204 of a user input via the GUI. Metadata associated with the test case flow that is stored in the metadata database 212 may include, for example, the name of the test case flow, the number steps, the number of nodes in each step, the number of sub-nodes in each node, the UC-API associated with each sub-node, and the user-defined arguments for each sub-node.

The test case flow, whether created by the user utilizing the GUI or created based on previously saved metadata, is utilized by the test script generator 200 to automatically generate the test script 202. Generation of the test script 202 may be initiated, for example, by receipt at the test script generator processor 204 of a user input via the GUI.

Figure 3:
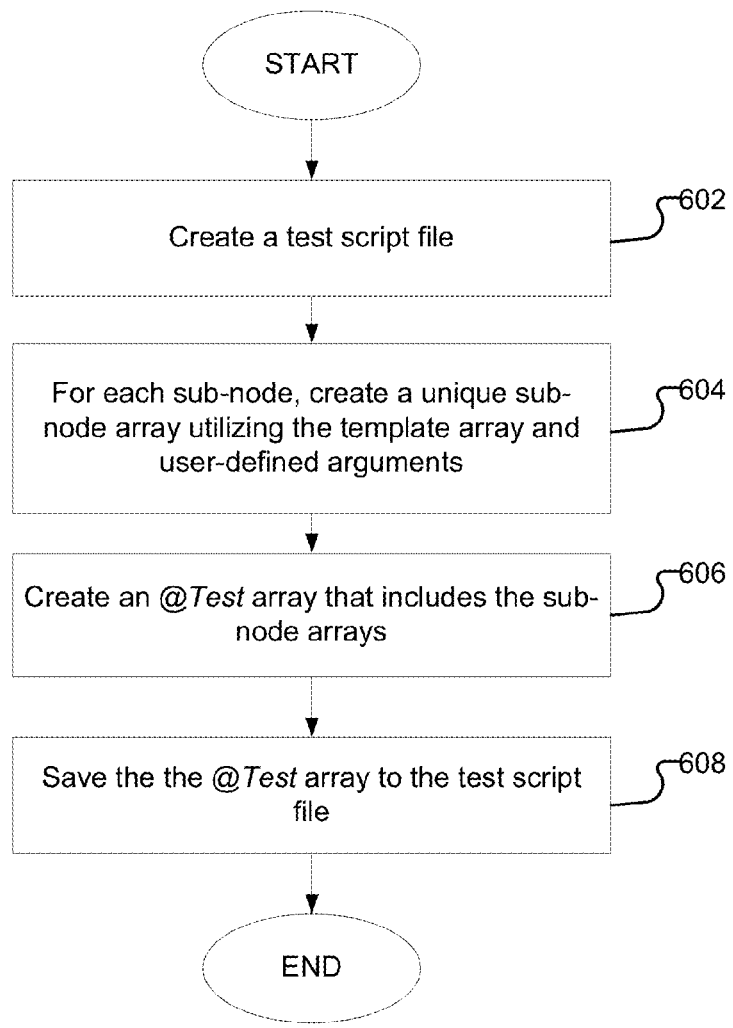
FIG. 3 is a flow chart of a method of automatically generating test script from a test case flow according to another embodiment.

FIG. 3 shows a flow chart of a method by which the test script generator 200 may generate the test script 202 utilizing the test case flow. The method may be performed by, for example, the test script generator processor 204 of the test script generator 200.

A test script file is generated at 602 for storing the automatically created test script that will be output by the test script generator 200.

At 604, a unique sub-node array is generated for each sub-node of the test case flow. The sub-node array for each sub-node is generated utilizing the template array associated with the UC-API of that sub-node. Each sub-node array includes a unique name to distinguish the arrays of different sub-nodes that are associated with the same UC-API. For example, the sub-nodes may be named by the following syntax: <UC-API name>_<sub-node identifier>, where <UC-API name> is the name of the UC-API associated with the sub-node, and <sub-node identifier> is the unique identifier associated with the sub-node. In the example illustrated in FIG. 2c, the associated sub-node array for sub-node $S_1N_1SN_1$ is ΩCreateVol_$S_1N_1SN_1$. The first element of the sub-node array is the name of the first API 306 of the TAF 300 to which the respective UC-API of the sub-node maps to. The second element of the sub-node array is an arguments array reference that contains the arguments that are passed to the API 306, including hard-coded and user-defined arguments. Additional APIs 306 that the UC-API maps to, and associated arguments, if any, are included as subsequent elements of the sub-node array.

After the sub-node arrays for all of the sub-nodes of the test case flow are created at 604, an @Test array is created at 606. As discussed in more detail below, the @Test array includes all of the sub-node arrays created at 604, with sub-node arrays organized such that, when the @Test array is sent to the TAF 300, the steps are executed sequentially, the nodes of a step are executed in parallel, and the sub-nodes of a node are executed sequentially.

At 608 the @Test array is saved into the test script file, which is output by the test script generator 200 as the test script 202 shown in FIG. 1. The test script file may then be passed to the TAF 300 where it is utilized by, for example, the TAF processor 302 to perform testing on the target product 400.

Figure 4:
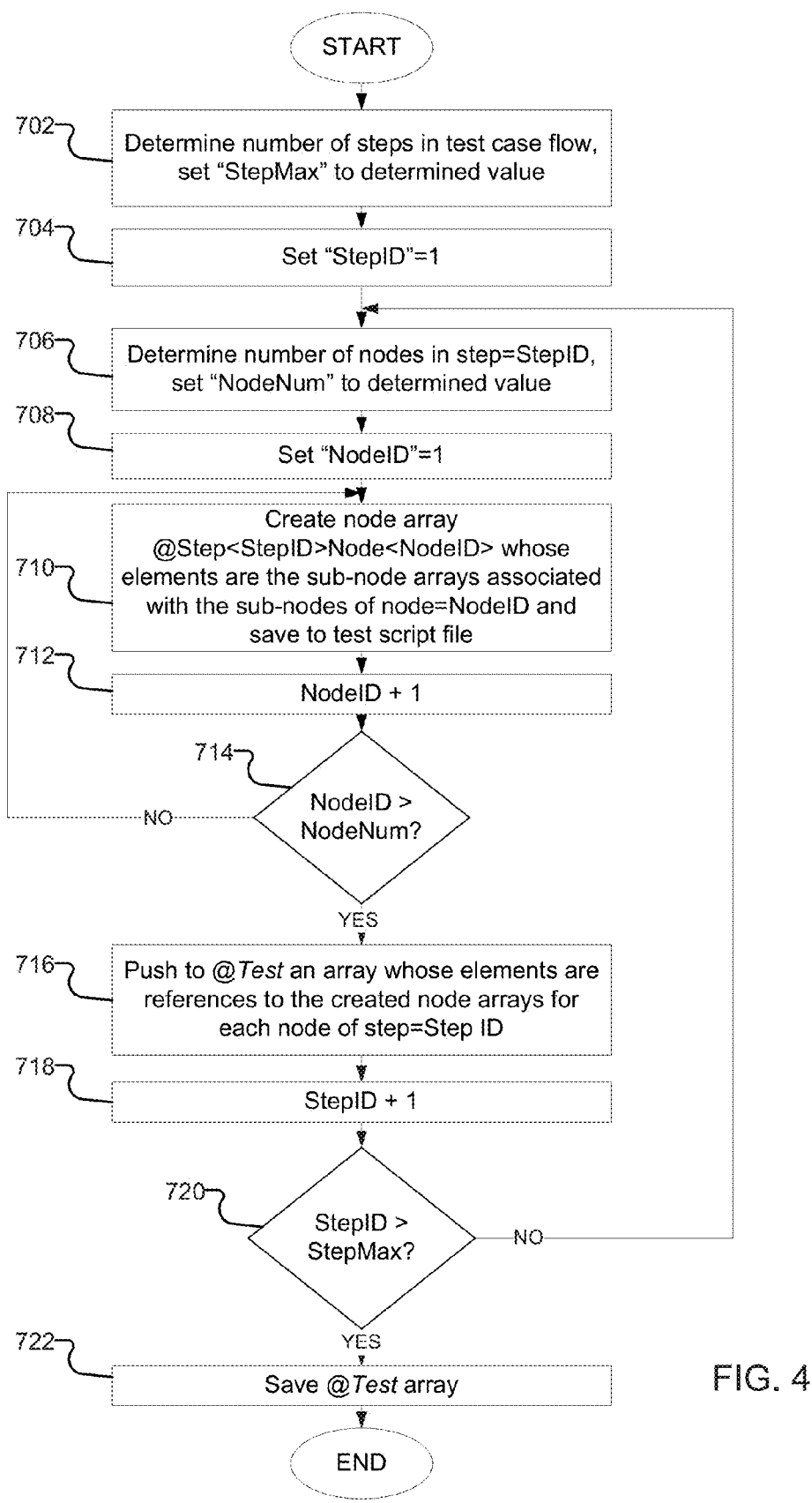
FIG. 4 is a flow chart of a method of generating an @Test array for use in the method according to the embodiment of FIG. 3.

Referring to FIG. 4, a flow chart illustrating a method of creating an @Test array is shown. The method may be carried out by, for example, the test script generator processor 204. At 702, the number of steps in the test case flow is determined and the value of a variable "StepMax" is set to the determined number of steps. At 704 the value of a variable "StepID" is set to one. At 706 the number of nodes included in step=<StepID> is determined and the value of a variable "NodeNum" is set to the determined number of nodes. At 708 a variable "NodeID" is set to one.

At 710, a node array @Step<StepID>Node<NodeID> is created for node=<NodeID> of step=<StepID>. For example, node array @Step1Node1 is created for the first node of the first step of the test case flow. The elements of the @Step<StepID>Node<NodeID> array are the sub-node arrays associated with node=<NodeID>. The sub-node arrays are included in the node array in the order that the sub-nodes appear in the test case flow. For example, the array created for the node $S_1N_1$ of the example shown in FIG. 2b would be: @Step1Node1=(ΩCreateVol_$S_1N_1SN_1$, @DeleteVol_$S_1N_1SN_2$, @Reboot_$S_1N_1SN_3$). The @Step<StepID>Node<NodeID> node array is saved to the test script file.

At 712, the value of the variable NodeID is increased by one. At 714 a determination is made whether NodeID is greater than NodeNum. If NodeID is determined not to be greater than NodeNum, then the method continues at 710 and a node array @Step<StepID>Node<NodeID> is created for the next node in the step=<StepID>.

If NodeID is determined to be greater than NodeNum, node arrays have been created for all of the nodes of step=<StepID> and the process continues at 716. At 716, a step array is created with elements consisting of node array references for the @Step<StepID>Node<NodeID> node arrays. The created step node is pushed to the @Test array. For example, for the step $S_1$ shown in FIG. 2a, the array that would be pushed to the @Test array at 718 is ([@Step1Node1], [@Step1Node2], [@Step1Node3]).

At 718 the value of the variable StepID is increased by one and, at 720, a determination of whether StepID is greater than StepMax is made. If StepID is determined not to be greater than StepMax, the method continues at 706 to create node arrays for the nodes of the subsequent step of the test case flow.

If StepID is determined to be greater than StepMax, step arrays for all of the steps of the test case flow have been created and the process continues 722 where the @Test array is saved to the test script file.

Once the test script 202 is generated by the test script generator 200 utilizing the methods illustrated in FIGS. 3 and 4, the test script 202 may be sent to the TAF 300 to be utilized by the TAF processor 302 to test the target product 400.

Figure 5:
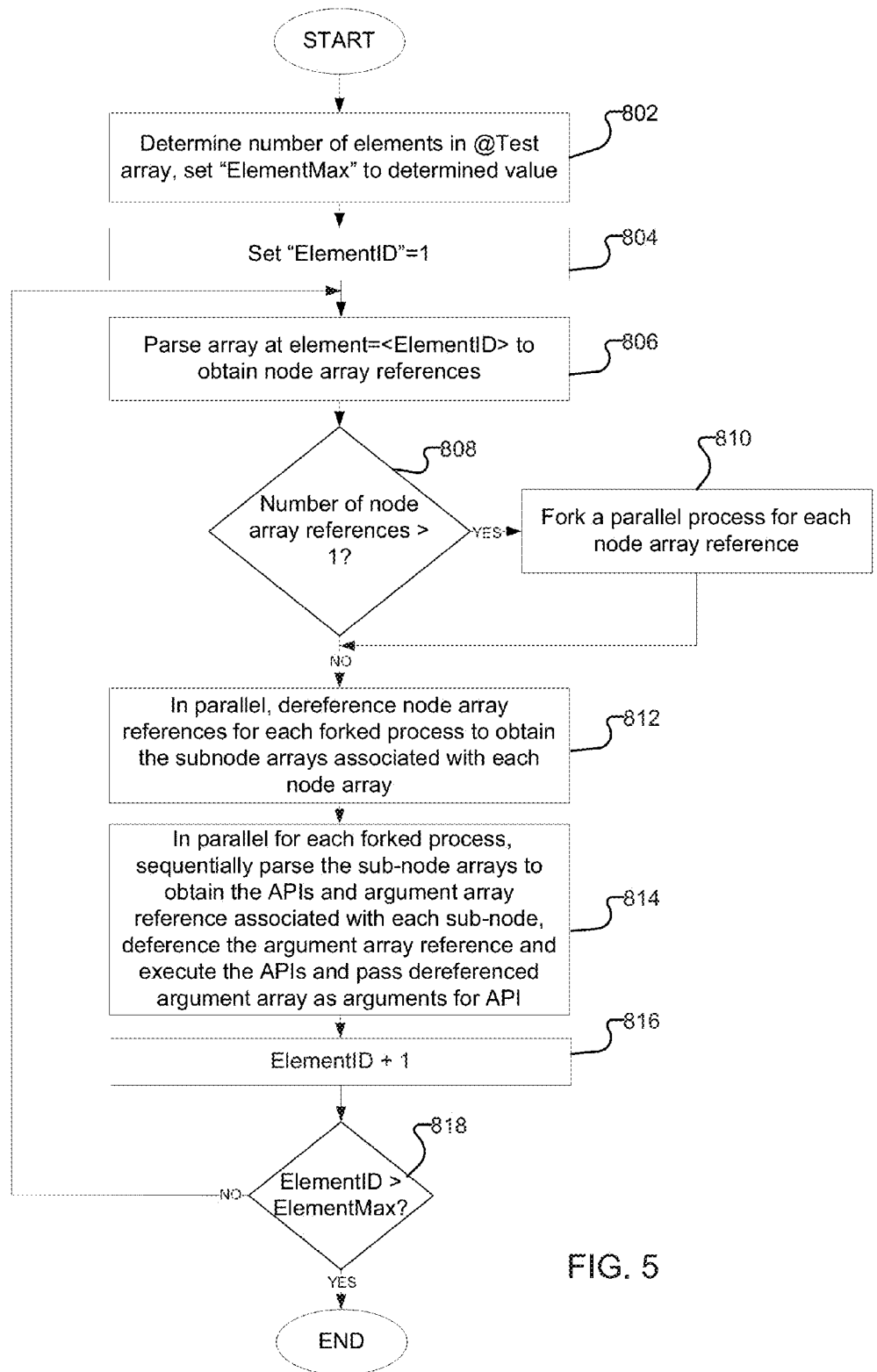
FIG. 5 is a flow chart of a method of parsing the @Test array generated by the method of FIG. 3.

Referring to FIG. 5, a flow chart illustrating a method for testing the target product 400 utilizing the @Test array of the test script 202 is shown. The method illustrated in FIG. 5 may be performed by, for example, the TAF processor 302 of the TAF 300.

At 802 the number of elements in the @Test array is determined and the value of a variable "ElementMax" is set to the determined number of elements. At 804 the value of a variable "ElementID" is set to one.

At 806, element=<ElementID> of the @Test array, comprising the step array for the step=<ElementID>, is parsed to obtain the node arrays references for the nodes of step=<ElementID>. As described above, each element of the @Test array is a step array whose elements are node array references.

At 808, a determination is made whether or not the number of node array references parsed from the array at element=<ElementID> of the @Test array is greater than one. If the number of node array references is determined to be greater than one, the method continues at 810 in which a parallel process is forked for each node array reference. Forking a separate process for each node array reference facilitates executing each node in parallel. Once the parallel processes are forked, the method continues at 812 where the node array references of each forked process are dereferenced, in parallel, to obtain the sub-node arrays. As described above, each sub-node array contains a pair of elements for each API 306 that the UC-API associated with the sub-node is mapped to. The first element of each pair is the name of the API 306 and the second element is an arguments array reference with elements comprising the arguments to be passed to the API 306. Each API 306 in the sub-node array is sequentially executed and the dereferenced argument array is passed as the arguments for the API 306 for execution by the TAF 300.

If, at 808, the number of node array references is not greater than one, the process continues directly to 812. In this case, the step array at element=<ElementID> of the @Test array includes a single node array reference and forking parallel processes is not necessary. A person skilled in the art will understand that, in the case in which the number of node array references is not greater than one, a single node array reference is dereferenced at 812 even though 812 refers to forked processes in parallel.

At 814, the sub-node arrays of each forked process are sequentially parsed to obtain the API(s) 306 and the argument array reference(s) associated with each sub-node array. The arguments array reference is dereferenced and the API(s) 306 is executed to perform the function associated function at the target product 400 with the arguments from the arguments array passed as arguments of the API 306. The sequential parsing and execution of the sub-node arrays is conducted for each of the forked process in parallel to ensure that nodes within a step are executed in parallel and sub-nodes within a node are executed sequentially when performing the testing functions on the target product 400. The TAF 300, including the APIs 306, Utilities & Tools 308, and Other Libraries 310, is configured to execute the API 306 with the passed the arguments from the arguments array in order to perform testing of the target product 400 in accordance with the test case flow.

After the UC-APIs associated with the sub-nodes are executed for all forked processes, the value of the variable ElementID is increased by one at 816. A determination is made whether the value of ElementID is greater than the value of ElementMax at 818.

If the value of ElementID is not greater than the value of ElementMax, the process returns to 806 where the step array of the next element of the @Test array is parsed. If the value of ElementID is determined to be greater than the value of Element Max, then all of the elements of the @Test array have been processed, and the method ends.

In addition to creating the test script 202, the test script generator 200 may also create the test description document 220 based on a test case flow. FIG. 6 shows an example of a test description document 220 that may be produced by the test script generator 200 based on a test case flow. The example test description document 220 shown in FIG. 6 is a spreadsheet file that is viewable using spreadsheet software such as, for example, MicroSoft Excel™. In other embodiments, the test description document 220 may be in any suitable document format.

The test description document 220 includes a header section 902 that includes the name of the test script, the test description, the test coverage, and the author of the test case flow.

The description of the steps, node, and sub-nodes of the test case flow are arranged in a table format. The tables associated with the steps of the test case flow are arranged vertically, with nodes within each step's table arranged horizontally in adjacent columns. Sub-nodes of a node are arranged vertically within the column of the associated node.

The test case flow associated with the test description document 220 illustrated in FIG. 6 includes two steps, the first step having one node having sub-node, and the second step including two nodes, the first node having two associated sub-nodes and the second node having one associated sub-node. Thus, the test description document 900 includes a Step1 description section 904 associated with the first step of the test case flow, and a Step2 description section 906 associated the second flow. The Step1 description section 904 includes one column, entitled "Process 1", for the node of Step1, which includes the description of one sub-node. The Step2 description section 906 includes two columns, entitled "Process 1" and "Process 2", one for each of the two nodes of the second step. The first column, Process 1, includes two rows of description, each row associated with one of the two sub-nodes of this node. The second column, Process 2, includes a single row of description associated with the sub-node of the second node.

As described above, the text descriptions that appear in the Step1 description section 904 and the Step2 description section 906 are generated utilizing a template descriptions stored in the description database 215.

The test description document 220 may be utilized by a user to determine whether the generated test script satisfies the intended requirements of the test case in order to verify that the test case flow was created as intended.

Although the test script generator 200, the TAF 300, and the target product 400 are shown in FIG. 1 as separate components, in some embodiments any or all of the test script generator 200, the TAF 300, and the target product 400 may be included within a single computer. For example, test script generator 200 and the TAF 300 may be included within a single computer such that the functions of the test script generator processor 204 and the TAF processor 302 performed by a single processor, and such that the test script generator memory 206 and the TAF memory 304 may be provided by a single memory.

In other embodiments, any or all of the test script generator 200, the TAF 300, and the target product 400 may be included on separate computer systems. In an example, the test script generator 200 may be implemented as a web page hosted on a web server such that users may access the test script generator 200 over the internet, rather than the user having a stand-alone test script generator 200 installed on their own computer. The test script 202 generated by the test script generator may be sent to the user's computer via the internet to be utilized by a TAF 300 on the user's computer, or on another computer. An advantage of implementing the test script generator 200 as a web page is that updates to the test script generator 200, or any component stored in the test script generator memory 206 may be made directly on the web server rather than each user updating a locally stored test script generator 200.

Further in some embodiments, any of the components within one of the test script generator 200 and the TAF 300 may be included on computers that are separate from the other components. For example, one or more of the UC-API database 207, the templates database 208, the arguments database 210, the metadata database 212, and the description database 215 may be located remotely from the operating system 214, the display 216, the input 218, and the test script generator processor 204 to provide centralized databases for the test script generator 200. An advantage of providing centralized databases is that the information stored in the databases could be updated to provide multiple users with the most current databases without the multiple uses each having to update their local databases.

The test script generator described herein automatically generates test script from a test case flow designed by a user. Utilizing the test script generator enables a user without coding experience create a test script for complex test cases that involve multiple parallel and sequential processes, with each of those processes consisting of a number of API calls. The above described test script code generator utilizes an intuitive, form-like graphical user interface to configure APIs. Utilizing a graphical design approach, the above described test script generator reduces the amount of coding knowledge, as well as understanding of test automation framework and test automation framework APIs, that is desired of a user in order to automate test cases.

From a test case flow the above described test script code generator will automatically generate a ready-to-execute test script that may be executed on a test automation framework to perform the test on a target system, reducing the test script development time drastically.

Along with the test script, the above described test script generator generates a test description document that describes the test script in plain text. The test description document enables a user to analyze the test case design and flow, and validate that the automated test script performs the testing that is desired without having to review the actual the test script itself.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A computer-implemented method of automatically generating test script for testing a target system, the method comprising processor performed steps of:
   receiving a test case flow that includes one or more steps, each step including one or more nodes, each node including one or more sub-nodes, wherein the steps are to be executed sequentially, the nodes of each step are to be executed in parallel, and the sub-nodes of each node are to be executed sequentially, wherein each sub-node is associated with a use-case based application programming interface (UC-API), and wherein each step, node, and sub-node includes a unique identifier;
   for each sub-node of the test case flow:
      retrieving a template array corresponding to the UC-API associated with the sub-node; and
      replacing a first placeholder in the template with the unique identifier of the sub-node to create a unique sub-node array;
   generating a test array utilizing the test case flow, wherein generating comprises: for each node in a step, generating a node array wherein the elements of each node array includes the sub-node arrays associated with the sub-nodes of the node, and wherein the sub-node arrays are sorted according to an order of the sub-nodes in the node of the test case flow;
   for each step, generating a step array wherein elements of each step array include references to the node arrays of the nodes in the step;
   populating the test array wherein each element of the test array includes one of the step arrays.

2. The computer-implemented method according to claim 1 further comprising testing the target system utilizing the test array, wherein testing comprises:
   parsing the test array for step arrays;
   for each step array:
      parsing the step array for node array references;
      forking a node process for each node array reference of the step array;
      for each node process, in parallel:
         dereferencing the node array;
         parsing the node array for references to sub-node arrays associated with the sub-nodes;
         for each sub-node array:
            executing the UC-API associated with the sub-node such that the sub-nodes of the node process are executed sequentially according to the order of the sub-nodes in the graphical representation of the node; and
      wherein the step arrays are parsed sequentially according to the order of the associated steps.

3. The computer-implemented method according to claim 1, wherein the UC-APIs associated with the sub-node arrays do not rely on other UC-APIs such that there is no data flow between UC-APIs.

4. The computer-implemented method according to claim 1, further comprising automatically generating a document including a text description of the test case flow, wherein the document includes a description of the UC-API associated with each sub-node of the test case flow, and wherein the document includes a table associated with each step, wherein each table includes a column associated with each node of the step, and each column includes a row associated with each sub-node of the node.

5. The computer-implemented method according to claim 1, wherein the test case flow is generated using a graphical user interface (GUI) such the graphical representations of the steps of the test case flow are arranged vertically to indicate that steps are performed sequentially, and the graphical representations of the nodes associated with a step are arranged horizontally within the graphical representation of the step to indicate that the nodes are performed in parallel.

6. The computer-implemented method according to claim 5, wherein selecting a graphical representation of a node causes a node define window to be displayed, wherein the node define window displays graphical representations of the sub-nodes associated with the node.

7. The computer-implemented method according to claim 6, wherein a graphical representation of a sub-node includes a drop down list for selecting an UC-API associated with the sub-node from a plurality of UC-APIs.

8. The computer-implemented method according to claim 1, wherein the test case flow is received from metadata stored in a memory, wherein the metadata includes the name of the test case flow, the number of steps in the test case flow, the number of nodes in each step, the number of sub-nodes in each node, the name of the UC-API associated with each sub-node, and selected arguments for each UC-API associated with each sub-node.

9. The computer-implemented method according to claim 1, wherein a graphical representation of each sub-node includes selected arguments for the associated UC-API, wherein the computer-implemented method further comprises replacing an argument placeholder of the template of a sub-node array with a selected argument from the graphical representation of the sub-node associated with the sub-node array.

10. A system for testing a target product, the system comprising:
   a test script generator comprising:
      a test script memory storing a plurality of templates, each template corresponding to one of a plurality of use-case-based application programming interfaces (UC-APIs);
      a test script input for receiving a test case flow that includes one or more steps, each step including one or more nodes, each node including one or more sub-nodes, wherein the steps are to be executed sequentially, the nodes of each step are to be executed in parallel, and the sub-nodes of each node are to be executed sequentially, wherein each sub-node is associated with a UC-API stored in the memory, and wherein each step, node, and sub-node includes a unique identifier; and
      a test script processor in communication with the memory and the input, the test script processor configured to:
         for each sub-node of the test case flow:
            retrieve a template corresponding to the UC-API associated with the sub-node; and
            replace a first placeholder in the template with the unique identifier of the sub-node to create a sub-node template;

generate a test array utilizing the test case flow, wherein generating comprises:

for each node in a step, generate a node array wherein elements of each node array include the sub-node arrays associated with the sub-nodes of the node, and wherein the sub-node arrays are sorted according to an order of the sub-nodes in the node of the test case flow;

for each step, generate a step array wherein elements of each step array include references to the node arrays of the nodes in the step; and populate the test array such that each element of the test array includes one of the step arrays.

11. The system according to claim 10, further comprising:
a test automation framework comprising:
a framework processor in communication with the test script generator, the processor configured to:
parse the test array for step arrays;
for each step array:
parse the step array for node array references;
fork a node process for each node array reference of the step array;
for each node process, in parallel:
dereference the node array for sub-node arrays associated with the sub-nodes of the node;
for each sub-node array:
execute the UC-API associated with the sub-node array such that the sub-nodes of the node process are executed sequentially according to the order of the sub-nodes in the test case flow of the node; and
wherein the step arrays are parsed sequentially according to the order of the associated steps.

12. The system according to claim 10, wherein the UC-APIs associated with the sub-node arrays do not rely on other UC-APIs such that there is no data flow between UC-APIs.

13. The system according to claim 10, wherein the test script processor is configured to automatically generate a document including a text description of the test case flow, wherein the document includes a description of each UC-API associated with each sub-node of the test case flow, and wherein the document includes a table associated with each step, wherein each table includes a column associated with each node of the step, and each column includes a row associated with each sub-node of the node.

14. The system according to claim 10, wherein the test case flow is generated using a graphical user interface (GUI) such the graphical representations of the steps of the test case flow are arranged vertically to indicate that steps are performed sequentially, and the graphical representations of the nodes associated with a step are arranged horizontally within the graphical representation of the step to indicate that the nodes are performed in parallel.

15. The system according to claim 14, wherein selecting a graphical representation of a node causes a node define window to be displayed, wherein the node define window displays graphical representations of the sub-nodes associated with the node.

16. The system according to claim 15, wherein a graphical representation of a sub-node includes a drop down list for selecting an UC-API associated with the sub-node from a plurality of UC-APIs.

17. The system according to claim 10, wherein the test case flow is received from metadata stored in the test script memory, wherein the metadata includes the name of the test case flow, the number of steps in the test case flow, the number of nodes in each step, the number of sub-nodes in each node, the name of the UC-API associated with each sub-node, and selected arguments for each UC-API associated with each sub-node.

18. The system according to claim 10, wherein a graphical representation of each sub-node includes selected arguments for the associated UC-API, and wherein the test script processor is configured to replace a parameter placeholder of the template of a sub-node array with a selected argument from the graphical representation of the sub-node associated with the sub-node array.

* * * * *